United States Patent
Sennyu

(10) Patent No.: US 8,883,690 B2
(45) Date of Patent: Nov. 11, 2014

(54) SUPERCONDUCTING ACCELERATING CAVITY PRODUCTION METHOD

(75) Inventor: Katsuya Sennyu, Minato-ku (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 301 days.

(21) Appl. No.: 13/380,235

(22) PCT Filed: Aug. 11, 2010

(86) PCT No.: PCT/JP2010/063628
§ 371 (c)(1),
(2), (4) Date: Dec. 22, 2011

(87) PCT Pub. No.: WO2011/021553
PCT Pub. Date: Feb. 24, 2011

(65) Prior Publication Data
US 2012/0100994 A1    Apr. 26, 2012

(30) Foreign Application Priority Data

Aug. 17, 2009    (JP) ................. 2009-188354

(51) Int. Cl.
*H01L 39/24*    (2006.01)
*H05H 7/20*    (2006.01)
*B23K 26/28*    (2014.01)
*B23K 26/12*    (2014.01)
*B23K 26/20*    (2014.01)

(52) U.S. Cl.
CPC ................. *H05H 7/20* (2013.01); *B23K 26/28* (2013.01); *B23K 26/122* (2013.01); *B23K 26/206* (2013.01)
USPC ...... 505/480; 505/200; 505/210; 219/121.64; 315/500; 333/99 S

(58) Field of Classification Search
CPC ........ H01L 39/24; H01L 39/248; H05H 7/20; H05H 7/22; H01P 7/06; B23K 26/20; B23K 26/206; B23K 26/28; B23K 26/12
USPC ......... 505/210, 300, 325, 921, 951, 480, 200; 315/500, 505, 506, 501; 148/96–98; 219/121.63, 121.64; 29/599; 228/103, 228/145
See application file for complete search history.

(56) References Cited

U.S. PATENT DOCUMENTS 5,239,157 A * 8/1993 Sakano et al. ........... 219/121.64

FOREIGN PATENT DOCUMENTS

| JP | 4-218300 | 8/1992 |
|---|---|---|
| JP | 4-322100 | 11/1992 |

(Continued)

OTHER PUBLICATIONS

Decision to Grant a Patent issued Oct. 8, 2013 in corresponding Japanese Application No. 2009-188354.

(Continued)

*Primary Examiner* — Stanley Silverman
*Assistant Examiner* — Kallambella Vijayakumar
(74) *Attorney, Agent, or Firm* — Wenderoth, Lind & Ponack, LLP

(57) ABSTRACT

A superconducting accelerating cavity production method with which a high-quality superconducting accelerating cavity can be produced with a compact device configuration and at low cost. The method of producing a superconducting accelerating cavity (1) includes arranging, in an axial direction (L), a plurality of half-cells (5) having openings at both ends in the axial direction and joining the openings to one another by welding. The half-cells (5) are joined by welding with a laser beam from the inside of the superconducting accelerating cavity (1) in which a vacuum atmosphere is created.

2 Claims, 3 Drawing Sheets

(56) References Cited

FOREIGN PATENT DOCUMENTS

| JP | 2000-260599 | 9/2000 |
| JP | 3959198 | 5/2007 |

OTHER PUBLICATIONS

International Search Report issued Sep. 7, 2010 in corresponding International Application No. PCT/JP2010/063628.

* cited by examiner

SUPERCONDUCTING ACCELERATING CAVITY PRODUCTION METHOD

BACKGROUND OF THE INVENTION

1. Technical Field

The present invention relates to a superconducting accelerating cavity production method.

2. Description of the Related Art

A superconducting accelerating cavity is formed by joining a plurality of components that are axially arranged. Conventionally, joining has been performed by electron-beam welding in a vacuum atmosphere, in which contamination with impurities is less likely to occur.

Furthermore, for example, the disclosure in Japanese Patent No. 3959198 proposes that joining of a superconducting accelerating cavity be performed in an argon atmosphere from the inside by laser welding.

SUMMARY OF THE INVENTION

1. Technical Problem

In the conventional electron-beam welding, because a driving system for driving the superconducting accelerating cavity, an electron gun, and the like are disposed in a vacuum atmosphere, the capacity of a vacuum chamber is large, which increases the size and cost of the system. Because the vacuum chamber has a large capacity, it takes time to form a vacuum atmosphere, which leads to problems of a long working time and high labor costs.

Furthermore, with the disclosure of Japanese Patent No. 3959198, in which laser welding is performed in an argon atmosphere, it may be difficult to achieve adequate performance.

The present invention has been made in view of such circumstances, and an object thereof is to provide a superconducting accelerating cavity production method with which a high-quality superconducting accelerating cavity can be produced with a compact device configuration and at low cost.

2. Solution to the Problem

To overcome the above-described problems, the present invention employs the following solutions.

Specifically, a superconducting accelerating cavity production method according to the present invention is a method, in which a superconducting accelerating cavity is produced by arranging, in an axial direction, a plurality of ring-like members having openings at both ends in the axial direction and joining the openings to one another by welding. The ring-like members are joined by welding with a laser beam from the inside of the superconducting accelerating cavity, in which a vacuum atmosphere is created.

In the present invention, the ring-like members constituting the superconducting accelerating cavity are joined by welding with a laser beam from the inside of the superconducting accelerating cavity, in which a vacuum atmosphere is created.

In this manner, because the welding means is provided inside the superconducting accelerating cavity, the area in which a vacuum atmosphere is created is limited to a small area covering the superconducting accelerating cavity. By doing so, joining can be performed with a compact device configuration, and hence, the system can be constructed at low cost. Furthermore, because the area in which a vacuum atmosphere is created is small, the vacuum atmosphere can be created in a short time. Because this enables a reduction in the working time, the labor costs can be reduced. In addition, because a high vacuum is easily realized, the welding can be performed in a high vacuum. Thus, a high-quality superconducting accelerating cavity can be produced.

In the present invention, it is desirable that the inside of the superconducting accelerating cavity be evacuated to create a vacuum atmosphere.

By doing so, a foreign substance, such as gas, generated during welding with a laser beam can be directly and constantly sucked and discharged. By doing so, a foreign substance, such as gas, can be prevented from depositing on the inner surface of the superconducting accelerating cavity, and thus, a high-quality superconducting accelerating cavity can be produced.

In the present invention, it is desirable that non-penetration welding be performed from the outside prior to welding with the laser beam from the inside of the superconducting accelerating cavity.

In this manner, by performing non-penetration welding on joints from the outside, a sealed inner space can be formed in the superconducting accelerating cavity. Thus, the superconducting accelerating cavity itself can be used as a vacuum chamber. Because a vacuum atmosphere can be created by evacuating the inner space of the superconducting accelerating cavity, a high vacuum can be easily realized. By doing so, laser welding can be performed in a high vacuum, and thus, a high-quality superconducting accelerating cavity can be produced.

3. Advantageous Effects of the Invention

With the present invention, because the welding means is provided inside the superconducting accelerating cavity, the system can be constructed at low cost, with a compact device configuration. Furthermore, because the area in which a vacuum atmosphere is created is small, the working time can be reduced, and the labor costs can be reduced. In addition, because a high vacuum is easily realized, a high-quality superconducting accelerating cavity can be produced.

DETAILED DESCRIPTION OF THE INVENTION

An embodiment of a superconducting accelerating cavity production method of the present invention will be described below with reference to FIGS. 1 to 3.

Figure 1:
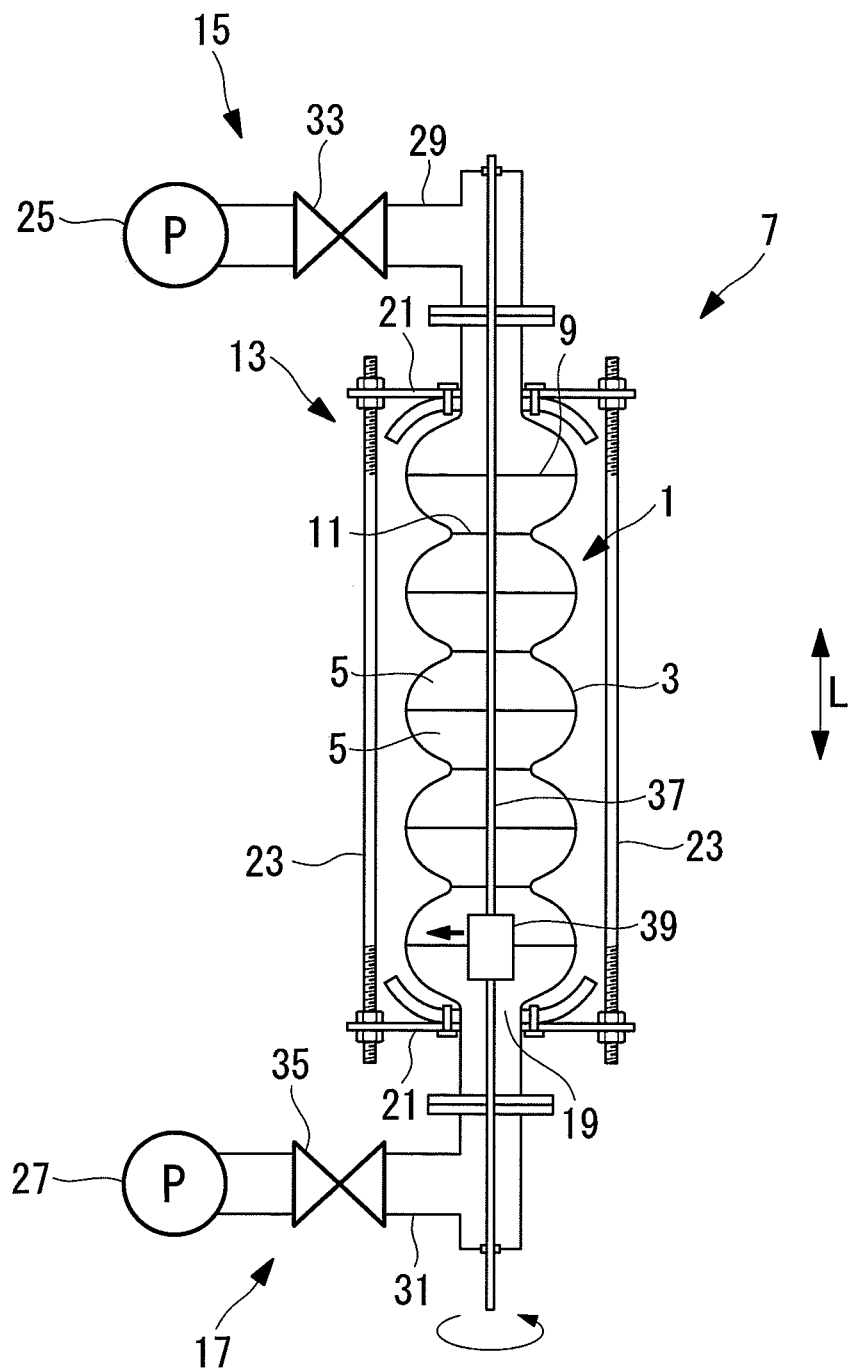
FIG. 1 is a block diagram showing the schematic configuration of a welding device that implements a superconducting accelerating cavity production method according to an embodiment of the present invention.

FIG. 1 shows the schematic configuration of a welding device that implements a superconducting accelerating cavity production method according to an embodiment of the present invention. FIG. 2 is a partial sectional view, showing a step in the superconducting accelerating cavity production method according to this embodiment. FIG. 3 is a partial sectional view, showing another step in the superconducting accelerating cavity production method according to this embodiment.

As shown in FIG. 1, a superconducting accelerating cavity 1 is a structure formed of, for example, five cylindrical cells 3 bulging in the middle. In the superconducting accelerating cavity 1, half-cells (ring-like members) 5 are formed by bending and press-molding, for example, a niobium material, which is a superconducting material. The half-cells 5 each constitute one of two segments of each cell 3 bisectioned in the axial direction. The half-cell 5 extends between an equatorial portion 9 where the cell 3 bulges most, in the axial direction L, and an iris portion 11 where the cell 3 is recessed most. Each half-cell 5 is a ring-like member having openings at both ends, i.e., portions corresponding to the equatorial portion 9 and the iris portion 11.

The plurality of half-cells 5 are arranged in the axial direction L such that the equatorial portions 9 overlap each other and such that the iris portions 11 overlap each other, and the contact portions are joined, thus forming the superconducting accelerating cavity 1.

The ring-like member is not limited to the half-cell 5; the cell 3, the two half-cells 5 integrated at the iris portion 11, or other various configurations may be used.

As shown in FIG. 1, the welding device 7 includes a holding member 13 for securing the superconducting accelerating cavity 1 to prevent deformation thereof, vacuum suction members 15 and 17 that evacuate the inside of the superconducting accelerating cavity 1, and a laser output device 19 disposed in the superconducting accelerating cavity 1.

The holding member 13 includes a pair of holding plates 21 that securely hold both ends of the superconducting accelerating cavity 1, and a plurality of securing shafts 23 that connect the pair of holding plates 21 and maintain the distance therebetween. The securing shafts 23 are made of a material whose coefficient of linear expansion is close to that of the material of the superconducting accelerating cavity 1. For example, if the superconducting accelerating cavity 1 is made of niobium, the securing shafts 23 are made of a niobium-zirconium alloy, titanium, or the like.

The vacuum suction members 15 and 17 respectively include vacuum pumps 25 and 27, suction pipes 29 and 31 through which the vacuum pumps 25 and 27 communicate with the inside of the superconducting accelerating cavity 1, and on-off valves 33 and 35 that open/close the suction pipes 29 and 31.

The suction pipe 29 is connected to a flange portion at one end of the superconducting accelerating cavity 1, and the suction pipe 31 is connected to a flange portion at the other end.

The laser output device 19 includes a rotation shaft 37 attached to the suction pipes 29 and 31 so as to pass through the central axis of the superconducting accelerating cavity 1 and so as to be rotatable about the central axis, and a laser output portion 39 accommodating a laser optical system (not shown) for outputting a laser beam.

The rotation shaft 37 is rotated about the central axis by a driving device (not shown).

The laser output portion 39 is attached to the rotation shaft 37 so as to be moveable in the axial direction L, while being prevented from moving in the rotation direction. Because the laser output portion 39 is disposed in the vacuum atmosphere, a mirror of the laser optical system accommodated therein is cooled. The laser optical system receives light supplied from an external light source (not shown) through, for example, an optical fiber.

Figure 2:
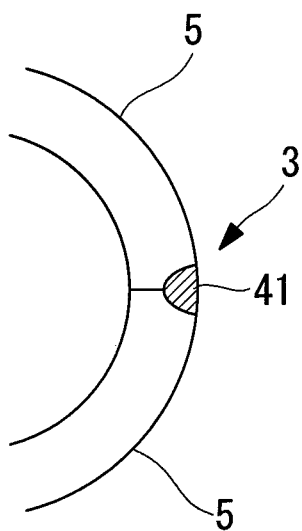
FIG. 2 is a partial sectional view, showing a step in the superconducting accelerating cavity production method according to an embodiment of the present invention.
Figure 3:
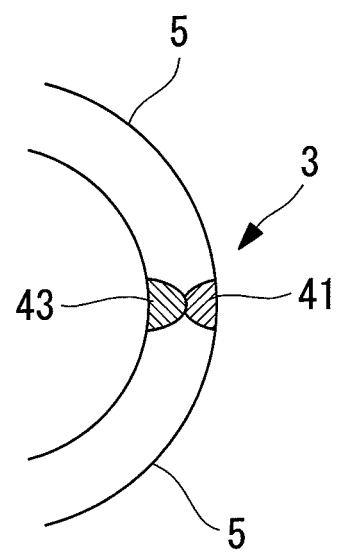
FIG. 3 is a partial sectional view, showing another step in the superconducting accelerating cavity production method according to an embodiment of the present invention.

In the superconducting accelerating cavity production method according to this embodiment, first, a plurality of half-cells 5 are stacked, and non-penetration welding 41 is performed on the equatorial portions 9 and the iris portions 11, which are joints, from the outer peripheral side, as shown in FIG. 2. Thus, the inner space inside the superconducting accelerating cavity 1 is sealed.

The non-penetration welding 41 on the outer peripheral side may be performed either by laser welding under an argon atmosphere, or by other known welding means.

In this state, the superconducting accelerating cavity 1 is conveyed into the welding device 7, and both ends thereof are securely attached to the holding plates 21. The securing shafts 23 are attached to the holding plates 21 so as to maintain the distance between the holding plates 21.

The suction pipes 29 and 31 are attached so as to communicate with the inner space inside the superconducting accelerating cavity 1. At the same time, the rotation shaft 37 and the laser output portion 39 are attached so as to be positioned at predetermined positions in the inner space inside the superconducting accelerating cavity 1.

In this state, the vacuum pumps 25 and 27 are activated to evacuate the inner space inside the superconducting accelerating cavity 1, creating a pressure of about, for example, $1 \times 10^{-4}$ Pa. As has been described, because the superconducting accelerating cavity 1 itself can be used as the vacuum chamber, the need to prepare a separate vacuum chamber is eliminated. By doing so, it becomes possible to simplify the device configuration and perform joining with a compact device configuration, and the system can be constructed at low cost.

Furthermore, because a vacuum atmosphere for laser welding can be created by evacuating a limited area, i.e., the inner space inside the superconducting accelerating cavity 1, a high vacuum can be easily realized.

Because the vacuum atmosphere can be created in a short time in this way, the working time can be reduced, and the labor costs can be reduced.

When a predetermined vacuum level of the inner space inside the superconducting accelerating cavity 1 has been reached, a welding operation by the laser output device 19 is started.

The laser output portion 39 is aligned with a joint. The laser optical system supplies light, i.e., a laser beam, supplied from the light source (not shown) to the joint of the half-cells 5 to perform non-penetration welding 43 on the equatorial portion 9 or the iris portion 11, which is the joint, from the inner peripheral side, as shown in FIG. 1.

By rotating the rotation shaft 37 at this time, the non-penetration welding 43 can be performed on the entire inner peripheral surface of the superconducting accelerating cavity 1.

Once welding is completed at one location, the laser output portion 39 is moved along the rotation shaft 37. The laser output portion 39 is moved to the next joint, and the laser welding is performed in the same manner.

When all the joints have been welded by repeating the above operation, the welding operation is completed.

Because a small-capacity vacuum atmosphere is created, i.e., only the inner space inside the superconducting accelerating cavity 1, it is easy to create a high vacuum. Because welding can be performed in a high vacuum, a high-quality superconducting accelerating cavity 1 can be produced.

Because the vacuum pumps 25 and 27 perform suction during welding, a foreign substance, such as gas, generated during welding with a laser beam can be directly and constantly sucked and discharged.

By doing so, it is possible to prevent a foreign substance, such as gas, from depositing on the inner surface of the accelerating cavity 1. Thus, a high-quality superconducting accelerating cavity 1 can be produced.

In this embodiment, although the superconducting accelerating cavity 1 is conveyed into the welding device 7 after it has been integrated by being subjected to welding on the outer peripheral side, it may be welded by the welding device 7.

For example, the stacked half-cells 5 may be held by the holding member 13 and welded from the outer peripheral side.

In this embodiment, after the superconducting accelerating cavity 1 has been integrated by being subjected to welding on the outer peripheral side, a vacuum atmosphere is created in the superconducting accelerating cavity 1, and welding on the inner peripheral side is performed. However, it is not limited thereto.

Figure 4:
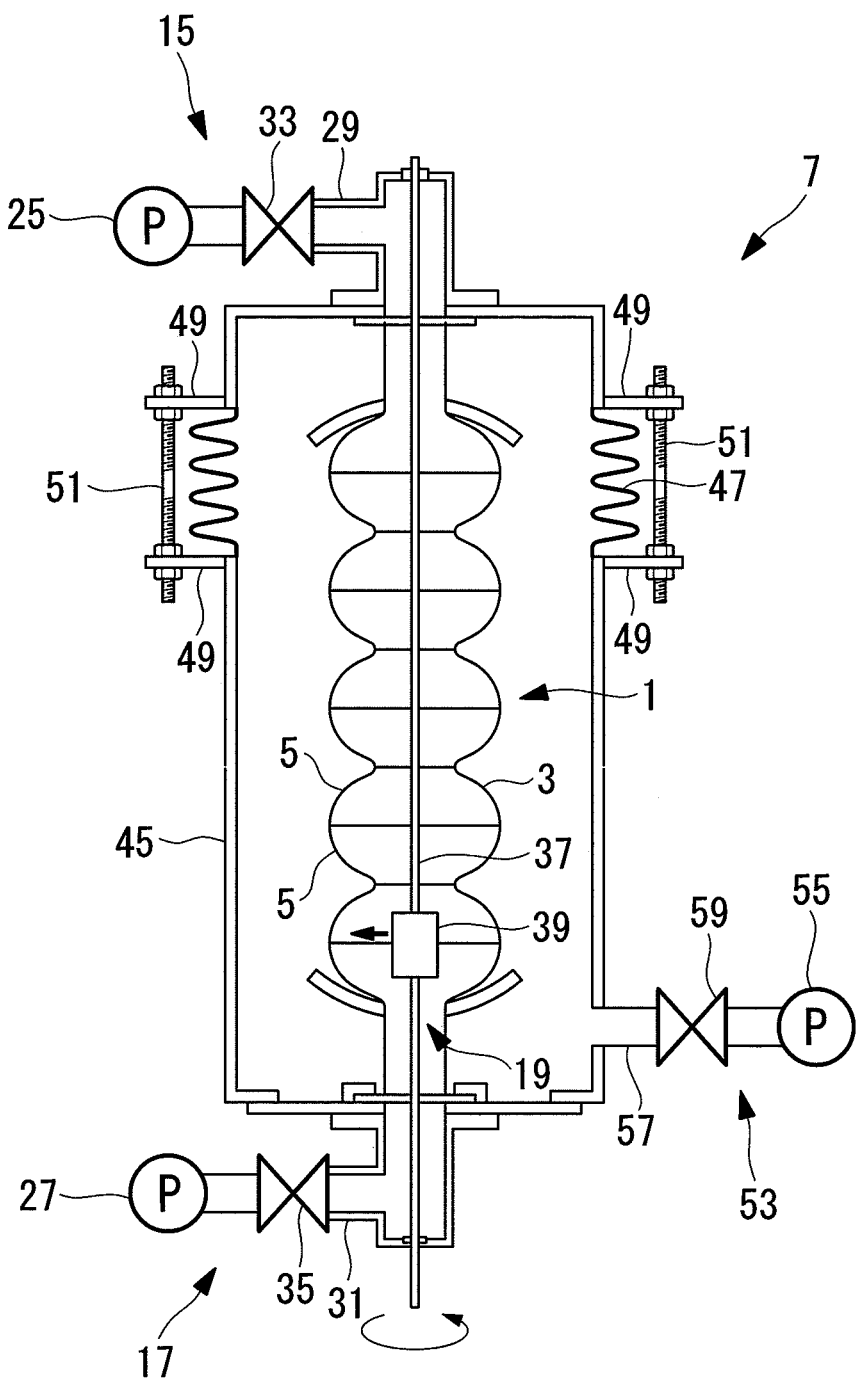
FIG. 4 is a block diagram showing the schematic configuration of another welding device that implements a superconducting accelerating cavity production method according to an embodiment of the present invention.

For example, as shown in FIG. 4, instead of the holding member 13, a vacuum chamber 45 having a space in which the superconducting accelerating cavity 1 can be accommodated may be provided.

The vacuum chamber 45 has a cylindrical shape with the axis extending in the up-down direction, a portion thereof in the height direction constituting a bellows portion 47 that can be expanded and contracted in the up-down direction. The lower end surface of the vacuum chamber 45 has a large opening into which the superconducting accelerating cavity 1 can be inserted. This opening is sealed by an end of the suction pipe 31.

A plurality of pairs of brackets 49, one above the bellows portion 47 and one below the bellows portion 47 and forming a pair, are provided at a certain interval in the peripheral direction. Securing shafts 51, each maintaining the distance between the pair of upper and lower brackets 49, are provided. The securing shafts 51 are attached in a removable manner.

The bellows portion 47 expands and contracts in response to changes in the height of the superconducting accelerating cavity 1 in the up-down direction. When the superconducting accelerating cavity 1 is installed, the securing shafts 51 are attached to limit the expansion and contraction of the bellows portion 47.

A vacuum suction member 53 that evacuates the inside of the vacuum chamber 45 is provided. The vacuum suction member 53 includes a vacuum pump 55, a suction pipe 57 through which the vacuum pump 55 communicates with the inside of the vacuum chamber 45, and an on-off valve 59 that opens/closes the suction pipe 57.

The stacked half-cells 5 are installed in the vacuum chamber 45. At this time, any variation in the height of the superconducting accelerating cavity 1 is absorbed by the expansion and contraction of the bellows portion 47.

The suction pipes 29 and 31 are attached so as to communicate with the inner space inside the superconducting accelerating cavity 1 and so as to seal the vacuum chamber 45.

At the same time, the rotation shaft 37 and the laser output portion 39 are attached so as to be positioned at predetermined positions in the inner space inside the accelerating cavity 1.

When these tasks are completed, the securing shafts 51 are attached so that the distance between the pairs of brackets 49 does not change.

In this state, the vacuum pumps 25, 27, and 55 are activated to evacuate the inner spaces inside the superconducting accelerating cavity 1 and vacuum chamber 45, creating a pressure of about $1 \times 10^{-4}$ Pa, for example.

Because the vacuum chamber 45 is barely large enough to cover the circumference of the superconducting accelerating cavity 1, the capacity to be evacuated is limited to a small area. By doing so, joining can be performed with a compact device configuration, and hence, the system can be constructed at low cost.

Furthermore, because the area in which a vacuum atmosphere is created is small, the vacuum atmosphere can be created in a short time. Because this enables a reduction in the working time, the labor costs can be reduced. In addition, because a high vacuum is easily realized, the welding can be performed in a high vacuum. Thus, a high-quality superconducting accelerating cavity 1 can be produced.

When a predetermined vacuum level of the inner space inside the accelerating cavity 1 has been reached, a welding operation by the laser output device 19 is started. In this case, penetration welding is performed on the equatorial portions 9 and the iris portions 11, which are the joints, from the inner peripheral side.

By rotating the rotation shaft 37 at this time, the penetration welding is performed on the entire inner peripheral surface of the superconducting accelerating cavity 1.

Once welding is completed at one location, the laser output portion 39 is moved to the next joint by following the above-described procedure, and the laser welding is performed in the same manner.

Because the vacuum pumps 25 and 27 perform suction during welding, a foreign substance, such as gas, generated during welding with a laser beam can be directly and constantly sucked and discharged.

By doing so, a foreign substance, such as gas, can be prevented from depositing on the inner surface of the accelerating cavity 1, and thus, a high-quality superconducting accelerating cavity 1 can be produced.

Note that it is also possible that non-penetration welding is performed, from the inner peripheral side, on the superconducting accelerating cavity 1, which has been integrated by being subjected to non-penetration welding from the outer peripheral side with the welding device shown in FIG. 4.

By doing so, the difference in pressure between the inside and the outside of the superconducting accelerating cavity 1 is reduced. Thus, the stress acting on the superconducting accelerating cavity 1 can be eliminated. Accordingly, the risk of the superconducting accelerating cavity 1 deforming can be eliminated.

Note that the present invention is not limited to the above-described embodiment, and it can be variously modified within a scope that does not depart from the spirit of the present invention.

The invention claimed is:

1. A superconducting accelerating cavity production method comprising:
    producing a superconducting accelerating cavity by arranging, in an axial direction, a plurality of ring-like members having openings at both ends;
    a non-penetration welding step of joining the openings to one another by non-penetration welding from outside of the superconducting accelerating cavity;
    a vacuuming step of creating a vacuum atmosphere by evacuating an inner space inside the superconducting accelerating cavity after the non-penetration welding step; and
    a laser welding step of joining the openings to one another by welding with a laser beam from the inside of the superconducting accelerating cavity, in which a vacuum atmosphere is created.
2. The superconducting accelerating cavity production method according to claim 1, wherein a suction operation is performed during the laser welding step, wherein the suction operation is performed by a vacuum pump.

* * * * *